United States Patent [19]

Kolinske et al.

[11] Patent Number: 4,889,006
[45] Date of Patent: Dec. 26, 1989

[54] ENGINE SPEED CONTROL CABLE CLIP ATTACHMENT

[75] Inventors: Edmund C. Kolinske, Big Bend; Arvo F. Uuskallio, Hartland, both of Wis.

[73] Assignee: Briggs & Stratton Corporation, Wauwatosa, Wis.

[21] Appl. No.: 173,169

[22] Filed: Mar. 24, 1988

[51] Int. Cl.$^4$ .............................................. F16C 1/06
[52] U.S. Cl. ................................... 74/502.4; 439/395; 439/396; 74/502.6; 24/136 R; 123/400; 248/74.4; 248/316.6; 403/337; 403/DIG. 3
[58] Field of Search ................. 439/396, 395, 402; 74/500.5, 501.5 R, 502.4, 502.6, 501.6; 24/136; 123/400, 366, 376; 248/67.5, 74.1, 74.4, 316.6, 316.7; 403/337, DIG. 9

[56] References Cited

U.S. PATENT DOCUMENTS

| | | | |
|---|---|---|---|
| 3,205,727 | 9/1965 | Severence | 74/500.5 |
| 3,273,417 | 9/1966 | Severence | 74/501.5 R |
| 3,854,114 | 12/1974 | Kloth et al. | 439/395 |
| 3,912,356 | 10/1975 | Johansson | 439/402 X |
| 4,130,331 | 12/1978 | Neff et al. | 439/396 |
| 4,212,503 | 7/1980 | Brooks et al. | 439/396 X |
| 4,225,207 | 9/1980 | Brandeau et al. | 439/395 X |
| 4,261,629 | 4/1981 | Reynolds et al. | 439/402 X |
| 4,527,852 | 7/1985 | Dechelette | 439/396 X |
| 4,546,666 | 10/1985 | Secord | 74/502.6 |
| 4,548,459 | 10/1985 | Mosser et al. | 439/395 X |
| 4,823,752 | 4/1989 | Uuskallio | 123/400 |

FOREIGN PATENT DOCUMENTS

| | | | |
|---|---|---|---|
| 0109141 | 5/1984 | European Pat. Off. | 439/395 |
| 0122780 | 10/1984 | European Pat. Off. | 439/395 |

OTHER PUBLICATIONS

Drawing No. 221535 dated Sep. 25, 1961 issued by Briggs & Stratton Corp.
Drawing No. 22372 dated Feb. 12, 1959 issued by Briggs & Stratton Corp.
Drawing No. 221535-2 dated Sep. 30, 1986 issued by Briggs & Stratton Corp.
Drawing No. 213146 dated Aug. 22, 1985 issued by Briggs & Stratton Corp.
"Briggs & Stratton Engine Accessories", brochure pp. 15 and 16 dated Jul. 1988.

Primary Examiner—Vinh Luong
Attorney, Agent, or Firm—Andrus, Sceales, Starke & Sawall

[57] ABSTRACT

A clamp for fixedly mounting the lower end of a remote speed control cable that controls the speed of a small internal combustion engine. The clamp includes a clip member removably attachable to the casing of the remote speed control cable and a mounting bracket on the engine for receiving and removably mounting the clip member thereon. The clip member is U-shaped with each side of the U having a bifurcated end defining a pair of legs having a cable receiving open therebetween dimensioned to tightly engage the casing of the cable. In one form, the mounting bracket includes a pair of horizontally extending and vertically spaced apart support ears having aligned clip receiving openings for snugly receiving the clip member, and in another form the bracket includes an upstanding support member about which opposite sides of the U-shaped clip member are disposed.

23 Claims, 2 Drawing Sheets

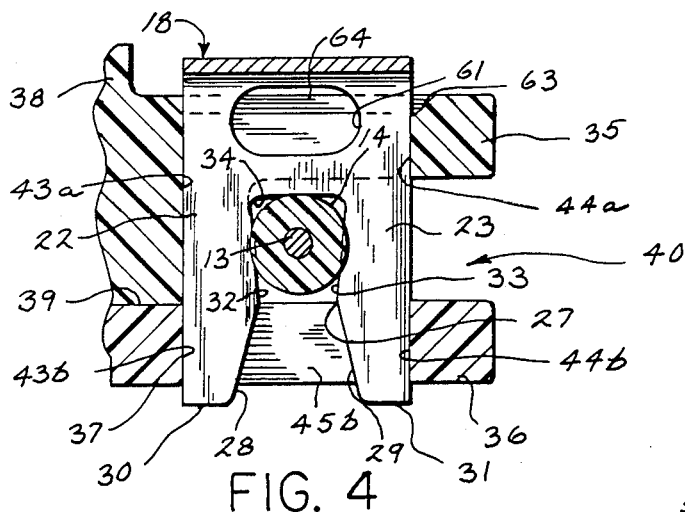
FIG. 4
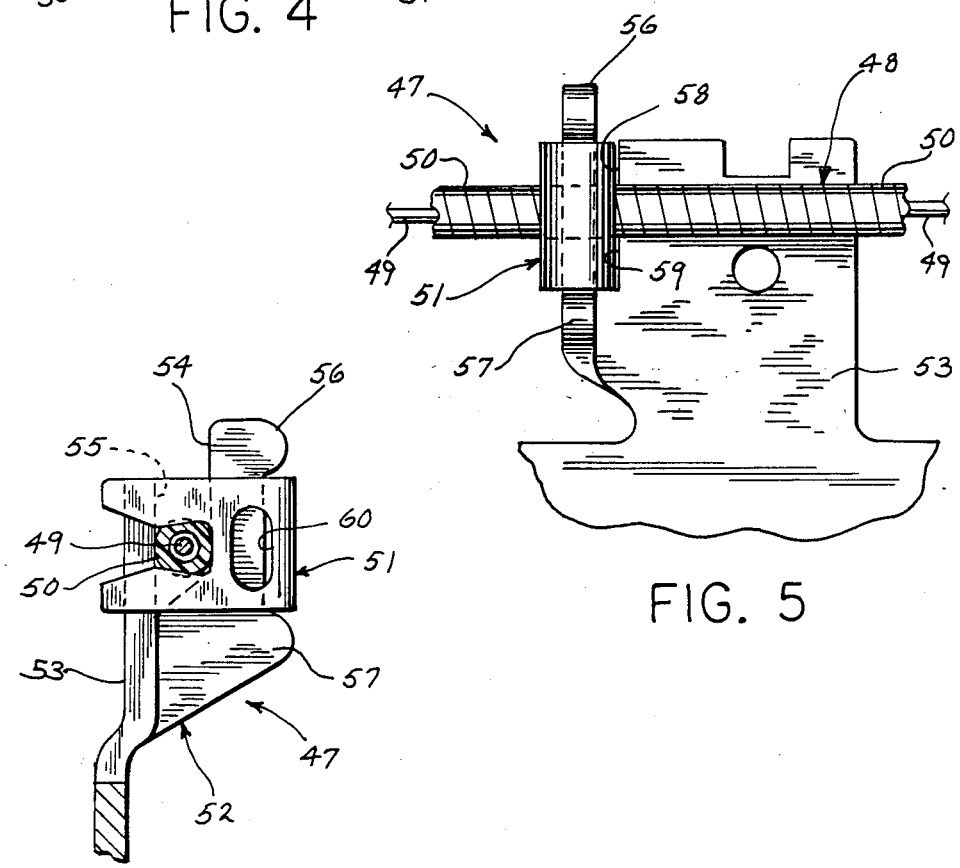
FIG. 5
FIG. 6

ENGINE SPEED CONTROL CABLE CLIP ATTACHMENT

BACKGROUND OF THE INVENTION

The present invention relates to internal combustion engines, and more particularly to a clamp for fixedly mounting on the engine a remote control cable that controls the speed of the engine.

The speed of small internal combustion engines employed with lawn and garden equipment, such as lawn mowers, is typically controlled by a remote speed control cable having one end connected to a remote speed control lever movable by an operator and its other end connected to a speed control lever on the engine. Such remote control cables generally employ a control wire slidably contained in a surrounding casing. The casing may be metal, plastic, and/or combinations thereof depending upon the particular application.

In the past, the lower end of the speed control cable was attached to the engine by first inserting the control wire into a hole in the end of the engine speed control lever and then mounting the end of the cable casing to the engine with a casing clamp. typically, this casing clamp is a metal C-shaped member having an opening formed through its web portion for receiving a screw that is threaded into a bore on an engine component. Thus, as the screw was tightened, the casing clamp would merely sandwich the control cable between the web portion of the C-shaped clamp and the engine component. Such clamps were oftentimes overtightened during assembly, which crushes the cable jacket or casing, thus preventing sliding of the cable wire within the jacket.

Another type of casing clamp utilized a metal block having a semi-circular shaped cable receiving slot formed along its inner surface. This clamp also utilized a screw extending through the metal block to attach the cable to a plastic fuel tank by sandwiching the cable against the side of the fuel tank. Typically, this casing clamp was utilized with plastic cable jackets or casings to prevent crushing of the casing or jacket. However, since the cable casing is plastic and the fuel tank is plastic, this type of clamp necessitated the use of a metal plate positioned between the cable and fuel tank, resulting in a threepart clamp, namely, the metal block, the metal plate and the screw. Such clamps involved assembly problems due to the need to properly position the three components of the clamp during assembly. Additionally, the plastic fuel tank required a tapped bore for receiving the screw which necessitated an insert molding process, thus increasing the cost of the fuel tank. Further, during assembly, if the screw is over-torqued by an electric or air drive tool and the threads of the tapped insert were stripped, the entire fuel tank needed to be discarded and replaced.

SUMMARY OF THE INVENTION

A clamp for fixedly mounting on an internal combustion engine the casing of one end of a remote speed control cable that controls the speed of the engine. The clamp includes a clip member removably attachable to the cable casing having a flat body extending substantially perpendicular to the longitudinal axis of the cable, and mounting means on the engine for receiving and removably mounting the clip member thereon. The body of the clip member includes a bifurcated end defining a pair of legs having a cable receiving opening therebetween dimensioned to tightly engage the casing of the cable.

The clip member is preferably U-shaped, with each side of the U having a bifurcated end defining a pair of legs having aligned cable-receiving openings. Each cable receiving opening has a constricted middle section forming a throat, a first end section having opposite edges diverging from the throat to the bifurcated end of the clip member and a second end section having opposite edges extending in a direction opposite to the edges of the first end section and diverging from the throat to an upper edge. Each cable-receiving opening is thus similar in shape to an hourglass.

The angle of divergence formed by the edges of the second end section is preferably less than the angle of divergence formed by the edges of the first section. For example, these angles may be approximately 4° and 20° respectively. The distance between the throat and upper edge of the second end section is at least equal to one-half the diameter of the remote speed control cable. Additionally, the distance between opposite edges of the throat is less than the diameter of the casing, but greater than the diameter of the control wire. Thus, the clip member permits positive holding of the casing, yet does not cut through or crush the cable casing.

In one form, the mounting means comprises a bracket projecting from the engine, including a pair of horizontally extending and vertically spaced apart support ears having aligned clip receiving openings formed therein. The clip receiving openings are dimensioned to snugly receive the clip member and provide abutment surfaces for preventing axial, lateral, and rotational movement of the clip member, yet permit ready removal of the clip member for servicing and/or replacement of the clip or cable.

In another form, the mounting means comprises a bracket projecting from the engine, which includes an upstanding support member spaced from the engine about which opposite sides of the U-shaped clip member are disposed. The upstanding support member itself prevents axial movement of the clip member and a pair of vertically spaced apart projecting bosses on the upstanding support member together with a pair of vertically spaced apart openings on the side of the upstanding support member formed in an engine component receive the toes of the legs of the bifurcated ends of the clip member for preventing lateral and/or rotational movement of the clip member.

The present invention thus provides a low cost clamp that positively holds the cable casing which is faster and easier to assemble than prior casing clamps. The clamp may be used on plastic, metal or combination plastic/-metal cable casings, will accept a variety or range of cable casing outer diameters, and avoids crushing or cutting through the cable casing. Additionally, the present clamp provides fewer components for assembly while advantageously maintaining the requirements for installation adjustability, easy servicability and economical replacement.

BRIEF DESCRIPTION OF THE DRAWINGS

The drawings illustrate the best mode presently contemplated of carrying out the invention.

In the drawings:

FIG. 4 is a cross-sectional view taken along the plane of the line 4—4 in FIG. 3;

FIG. 5 is a fragmentary side view in elevation of a second embodiment of the casing clamp; and FIG. 6 is an end view of the casing clamp of FIG. 5.

DESCRIPTION OF THE PREFERRED EMBODIMENT

Figure 1:
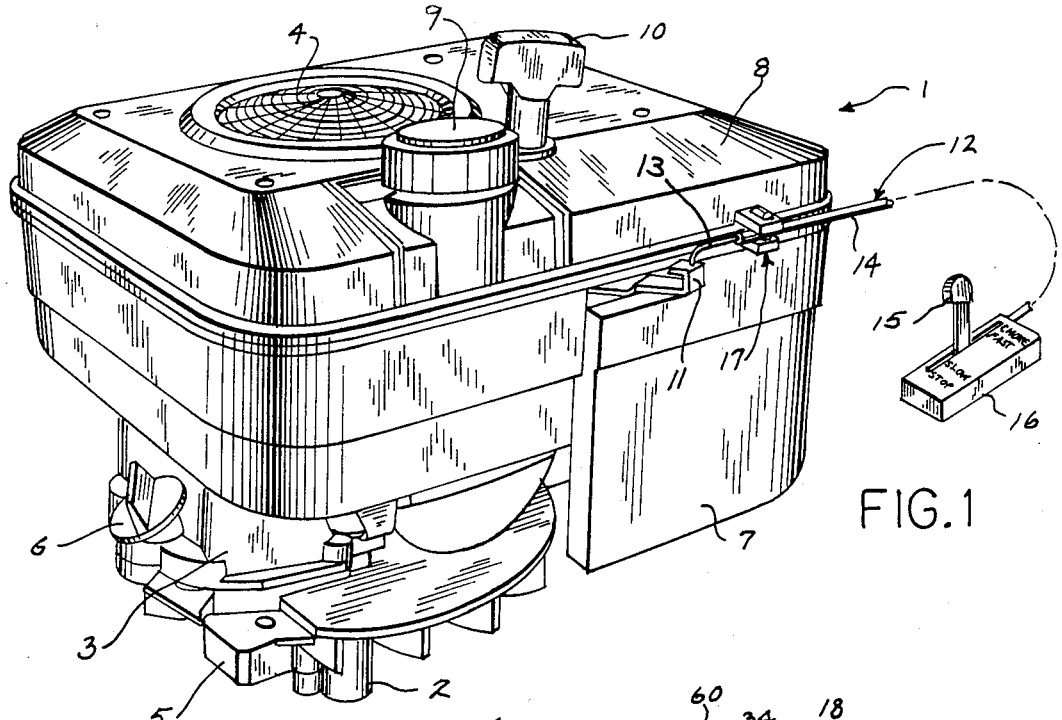
FIG. 1 is a perspective view of an internal combustion engine incorporating one embodiment of a casing clamp constructed in accordance with the principals of the present invention.

Referring now to the drawings, FIG. 1 illustrates small internal combustion engine, generally designated by the numeral 1, for use in connection with lawn and garden equipment, such as lawn mowers. Engine 1 is of the vertical shaft type and includes a crankshaft 2 connected to a piston (not shown) within cylinder 3, and a rotating air filtering screen 4. Oil for cylinder 3 is contained within oil sump 5 which may be filled via removal of an oil fill cap 6. Engine 1 also includes an air cleaner 7, a fuel tank 8 that may be filled via a fuel fill cap 9, and an optional handle 10 connected to a vertical pull starter rope (not shown). Fuel tank 8 is composed of a plastic material which reduces the overall weight of engine 1. Engine 1 also includes a speed control lever 11 which is pivotally mounted on engine 1 having one end projecting from engine 1 between air cleaner 7 and fuel tank 8, and its other end operatively connected to the carburetor of engine 1 for controlling the speed of engine 1.

A remote speed control cable 12 is typically used with lawn and garden equipment such as lawn mowers to control the speed of engine 1 by pivoting or moving engine speed control lever 11. Cable 12 defines a longitudinal axis and includes a metal control wire 13 slidably mounted within a surrounding plastic casing or jacket 14. As shown best in FIG. 1, one end of upper end of control wire 13 is connected to a remote speed control lever 15, which is pivotally mounted within a speed control box 16. Speed control box 16 is typically mounted on the handle assembly of a lawn mower for manual movement of lever 15 by an operator. The other end or lower end of the control wire 13 is connected to the projecting end of engine speed control lever 11. Cable casing 14, in turn, has its upper end connected to control box 16 and its lower end fixedly mounted on engine 1 by a casing clamp 17. Thus, movement of control wire 13 by an operator pivoting remote speed control lever 15 results in movement of engine speed control lever 11 which, in turn, controls the speed of engine 1.

Figure 2:
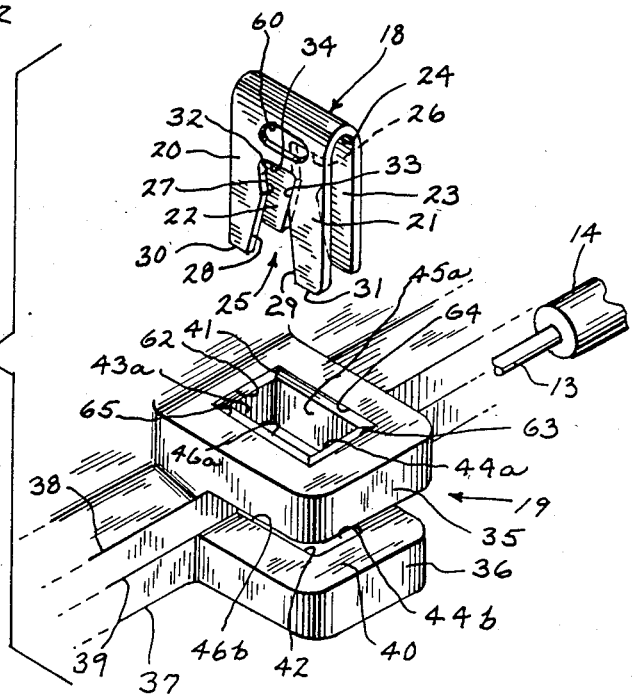
FIG. 2 is an exploded perspective view illustrating the components of the casing clamp of FIG. 1.
Figure 3:
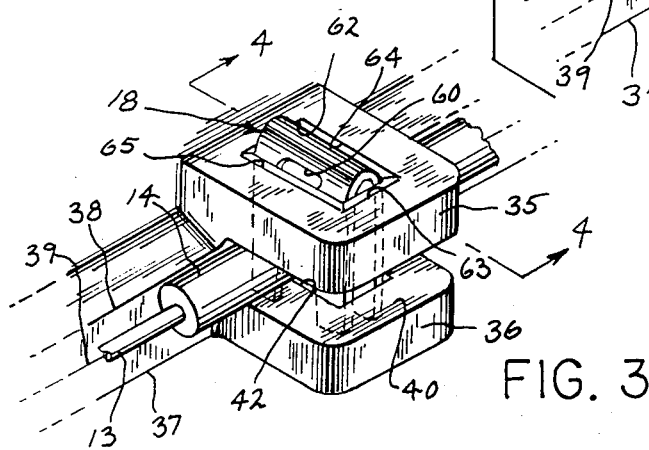
FIG. 3 is a perspective view illustrating the components of the casing clamp of FIG. 1 in their assembled condition.

Turning now to FIGS. 2-4, there is illustrated in more detail the components of a first embodiment of casing clamp 17. Casing clamp 17 includes a metal clip member 18 removably attachable to casing 14 and a plastic mounting bracket 19 integrally formed on the side of plastic fuel tank 8 on engine 1 for receiving and removably mounting clip member 18 thereon. Clip member 18 comprises an elongated, relatively flat U-shaped body with each side of the U-shaped body terminating in a bifurcated end. Each bifurcated end of each side of the U-shaped body thus forms a pair of spaced apart legs 20, 21 and 22, 23, respectively. The upper or head end of the sides of the U-shaped body are integrally interconnected to form the web portion thereof and define an elongated slot 24 extending between the substantially parallel sides of the U-shaped body of clip member 18. The upper or head end of each of the sides of the U-shaped body also includes an oblong tool-receiving opening 60,61 respectively, formed therethrough. As shown best in FIGS. 3 and 4, openings 60,61 are positioned such that when clip member 18 is inserted within bracket 19 a portion thereof is disposed above bracket 19 such that the tip of a screw driver or other suitable tool may be inserted therein to remove clip member 18 from bracket 19 for servicing and/or replacement if necessary.

Legs 20, 21 and legs 22, 23 each define aligned cable receiving openings 25, 26 therebetween, dimensioned to tightly engage casing 14 of control cable 12. Both openings 25,26 are identical in shape and therefore, only opening 25 will be described hereinafter. Opening 25 includes a constricted middle section forming a throat 27, a first or lower end section having opposite edges 28, 29 diverging from throat 27 to the toes 30, 31 of legs 20, 21 of clip member 18, and a second or upper end section having opposite edges 32, 33 extending in a direction opposite to edges 28, 29 and diverging from throat 27 to an upper edge 34, which is located between throat 27 and the head end of clip member 18.

As shown best in FIG. 4, the angle of divergence formed by edges 32, 33 is less than the angle of divergence formed by edges 28, 29. Preferably the angle of divergence of edges 32, 33 is about 4° and the angle of divergence of the edges 28, 29 is about 20°. The distance between throat 27 and upper edge 34 is at least equal to one-half the diameter of remote control cable 12 and preferably, as shown best in FIG. 4, is slightly greater than the diameter of cable 12. Additionally, as shown best in FIG. 4, the distance between opposite edges of throat 27 is less than the diameter of cable casing 14, but greater than the diameter of control wire 13. The above dimensions insure that edges 32, 33 "bite" into and tightly engage casing 14 of cable 12. Typically, the outer diameter of cable 12 varies from a minimum of about 0.185 inches to a maximum of about 0.230 inches. Additionally, the location of throat 27 with respect to upper edge 34 insures an "over-center" type positioning of cable 12 within opening 25, as best shown in FIG. 4, which thus prevents clip member 18 from backing off of cable 12 once cable 12 is positioned between edges 32, 33.

Mounting bracket 19 includes a pair of horizontally extending and vertically spaced apart support ears 35, 36 integrally projecting from the side of fuel tank 8 in a cantilevered fashion. The inner end of each ear 35, 36 is integral with fuel tank 8, and each ear 35, 36 is composed of the identical plastic material as fuel tank 8, so as to permit molding of both fuel tank 8 and ears 35, 36 at the same time. It should be noted that fuel tank 8 is comprised of a base 37 and a cover 38 sealed along a parting line 39. Thus, ear 35 may be integrally molded with cover 38 and ear 36 may be integrally molded with base 37, so that when assembled ears 35, 36 are vertically spaced apart from one another, as shown best in FIGS. 2-4, to define a cable receiving slot 40 therebetween. As shown best in FIG. 4, the distance between ears 35, 36 and thus the width of slot 40, is slightly greater than the diameter of cable 12.

Ear 35 includes a clip receiving opening or slot 41 vertically aligned with a clip receiving opening or slot 42 in ear 36. Slots 41, 42 define inner abutment surfaces 43a, 43b, outer abutment surfaces 44a, 44b, upstream abutment surfaces 45a, 45b, and downstream abutment surfaces 46a, 46b, respectively. Slots 41, 42 are dimensioned substantially corresponding to the outer dimensions of clip member 18 so as to snugly receive clip member 18 to prevent axial, lateral and rotational movement thereof. As shown best in FIGS. 3 and 4, abutment surfaces 43a and 44a engage the outside edges of the head portions of clip member 18, while abutment surfaces 43b and 44b engage the outside edges of toes 30, 31 of legs 20, 21. Abutment surfaces 43a, 43b, 44a, and 44b thus prevent lateral movement of clip member 18 with repect to the longitudinal axis of control cable 12. Additionally, these surfaces prevent rotational movement of clip member 18 about cable 12. As shown best in FIG. 3, abutment surfaces 45a, 46a engage the outside flat surfaces of the head portions of clip member 18, while abutment surfaces 45b, 46b engage the outside flat surfaces of toes 30, 31 of legs 20, 22. Thus, surfaces 45a, 45b, 46a and 46b prevent movement of clip member 18 axially with respect to the longitudinal axis of control cable 12. As a result, clip member 18 is immobilized after insertion into slots 41, 42. The upper edges of slot 41 adjacent abutment surfaces 43a, 44a, 45a and 46a include chamfered surfaces 62, 63, 64 and 65, respectively, which are tapered downwardly into slot 41. Chamfered surfaces 62-65 provide sufficient accessibility to openings 60, 61 in clip member 18 and to the upper end of slot 24 to permit easy insertion of the tip of a screw driver or other tool to remove clip member 18 from bracket 19 if necessary.

In order to fixedly mount casing 14 of cable 12 on engine 1, control wire 13 is first inserted into a hole in the projecting end of engine speed control lever 11, with engine speed control lever 11 and remote speed control lever 15 adjustably positioned for proper operation. Control cable 12 is then positioned within cable receiving slot 40 between ears 35, 36 and clip member 18 is inserted into slot 41 of ear 35 until edges 28, 29 rest upon the surface of casing 14. Thereafter, a tool such as a pliers may be utilized to squeeze clip member 18 downwardly through slots 41, 42, until cable 12 is positioned between edges 32, 33, as shown in FIG. 4, with the upper end of clip member 18 slightly above the upper surface of ear 35 to hold cable 12. As shown best in FIG. 4, clip member 18 extends substantially perpendicular to the longitudinal axis of cable 12. In order to disassemble clip member 18 from bracket 19, a tool such as a screwdriver may be inserted along either chamfered surface 62 or 63 into opening 60 or 61 respectively, and the screw driver is then used as a lever to pry clip member 18 upwardly off of cable 12.

Turning now to FIGS. 5 and 6, there is illustrated an alternate or second embodiment of a casing clamp, generally designated by the numeral 47. In this embodiment, a remote speed control cable 48 includes a metal control wire 49 slidable mounted within and surrounded by a metal casing or jacket 50. In all other respects, control cable 48 operates identically as previously described with respect to control cable 12.

Casing clamp 47 includes a metal clip member 51, which is identical to clip member 18 described with respect to the first embodiment herein and, therefore, need not further be described, and a mounting bracket 52. Mounting bracket 52 is composed of a metal material, and includes a flat base plate 53 mounted on an engine component and an upstanding flat support plate 54 projecting from base plate 53. Support plate 54 is spaced from base plate 53 to form a cable receiving slot 55 therebetween. Support plate 54 is disposed in a plane substantially perpendicular to the plane containing base plate 53, so that support plate 54 also extends substantially perpendicular to the longitudinal axis of control cable 48. Upstanding support plate 54 includes a pair of vertically spaced apart bosses 56, 57 projecting from the upper and lower ends thereof. As shown best in FIG. 6, bosses 56, 57 engage the opposite outside edges of the head portions of clip member 52, and function as abutments or stops for preventing lateral and/or rotational movement of clip member 51. As shown best in FIG. 5, base plate 53 also includes an upper slot 58 and a lower slot 59 for receiving and snugly engaging the toes of the legs of the bifurcated end of the right hand side of clip member 51. Slots 58, 59 also aid in preventing lateral and/or rotational movement of clip member 51. It should also be noted that upstanding support plate 54 itself functions to prevent axial movement of clip member 51 with respect to the axis of control cable 48, since it is received within the elongated slot formed between the opposite sides of clip member 51. Thus, once assembled, clip member 51 is prevented from moving axially since support plate 54 will engage the inner flat surfaces of clip member 51. Thus, clip member 51 is prevented from moving axially, laterally and/or rotationally.

In order to assemble casing clamp 47, control wire 49 is connected to the projecting end of engine speed control lever 11 and then placed between base plate 53 and support plate 54 in cable receiving slot 55. Thereafter, clip member 51 is positioned, so that its sides straddle support plate 54 and the inside edges of its legs engage the surface of casing 50 of control cable 48. A light tap with a small hammer or other small tool then drives clip member 51 onto cable 48 in the position shown in FIG. 6. The removal of clip member 51 may be accomplished by simply inserting a tool, such as a screwdriver, into either of the oblong openings formed in the head end of the sides of clip member 51 so that its tip engages the outer edge of support plate 54. The tool is then used as a lever to pry clip member 51 outwardly to separate clip member 51 from control cable 48 and bracket 52.

A casing clamp has been illustrated and described which provides a simple and reliable method of mounting the casing of the lower end of a remote speed control cable to an engine. Various modifications and/or substitutions may be made to the specific components described herein without departing from the scope of the invention. For example, different materials of construction may be utilized than those specifically described and illustrated herein depending upon the particular application and control cable utilized. Additionally, although two specific types of cables have been illustrated and described herein, various other types of cables may be utilized with the casing clamp wherein the control wire is composed of plastic and/or metal of the monofilament and/or stranded type and the casing or jacket is composed of plastic, metal and/or combinations thereof.

Various modes of carrying out the invention are contemplated as being within the scope of the following claims particularly pointing out and distinctly claiming the subject matter which is regarded as the invention.

We claim:

1. In an internal combustion engine including a speed control lever on the engine and a remote speed control cable for moving said engine speed control lever to control the speed of the engine, said remote speed control cable defining a longitudinal axis and having a control wire connected at one end to a remote speed control lever and at its other end to said engine speed control lever and a casing surrounding said control wire slidable receiving said wire therein, the improvement comprising a casing clamp for fixedly mounting said casing on the engine to permit sliding movement of said control wire relative to said casing, said casing clamp comprising:

a clip member removably attachable to said casing including a flat body extending substantially perpendicular to the longitudinal axis of said cable, said body having a head end and bifurcated end defining a pair of legs having a cable-receiving opening therebetween dimensioned to tightly engage the casing of said cable; and mounting means on the engine for receiving and removable mounting said clip member thereon, said mounting means includes first abutment means for preventing movement of said body axially with respect to said control cable axis, second abutment means for preventing movement of said body laterally with respect to said control cable axis, and said mounting means comprises a bracket projecting from said engine including a pair of spaced apart support members having aligned clip-receiving openings formed therein, said clip-receiving openings dimensioned to snugly receive said clip member.

2. The casing clamp of claim 1 wherein said cable-receiving opening includes a constricted middle section forming a throat, a first end section having opposite edges diverging from said throat to the bifurcated end of said clip member, and a second end section having opposite edges extending in a direction opposite to the edges of said first end section and diverging from said throat to an upper edge located between said throat and said head end.

3. The casing clamp of claim 2 wherein the angle of divergence formed by the edges of said second end section is less than the angle of divergence formed by the edges of said first section.

4. The casing clamp of claim 3 wherein the angle of divergence of the edges of said second end section is about 4°.

5. The casing clamp of claim 2 wherein the distance between said throat and said upper edge is at least equal to one half the diameter of said remote speed control cable.

6. The casing clamp of claim 2 wherein the distance between opposite edges of said throat is less than the diameter of said casing and greater than the diameter of said control wire.

7. The casing clamp of claim 2 wherein the body of said clip member is U-shaped with each side of the U terminating in a bifurcated end.

8. The casing clamp of claim 2 wherein the body of said clip member includes a tool-receiving opening therethrough disposed between the upper edge of said second end section and said head end.

9. In an internal combustion engine including a speed control lever on the engine and a remote speed control cable for moving said engine speed control lever to control the speed of the engine, said remote speed control cable defining a longitudinal axis and having a control wire connected at one end to a remote speed control lever and at its other end to said engine speed control lever and a casing surrounding said control wire slidably receiving said wire therein, the improvement comprising a casing clamp for fixedly mounting said casing on the engine to permit sliding movement of said control wire relative to said casing, said casing clamp comprising:

a clip member removably attachable to said casing including a flat body extending substantially perpendicular to the longitudinal axis of said cable, said body having a head end and bifurcated end defining a pair of legs having a cable-receiving opening therebetween dimensioned to tightly engage the casing of said cable, said cable-receiving opening includes a constricted middle section forming a throat, a first end section having opposite edges diverging from said throat to the bifurcated end of said clip member, and a second end section having opposite edges extending in a direction opposite to the edges of said first end section and diverging from said throat to an upper edge located between said throat and said head end, and the body of said clip member includes a tool-receiving opening therethrough disposed between the upper edge of said second end section and said head end; and mounting means on the engine for receiving and removably mounting said clip member thereon.

10. The casing clamp of claim 9 wherein the angle of divergence formed by the edges of said second end section is less than the angle of divergence formed by the edges of said first section.

11. The casing clamp of claim 10 wherein the angle of divergence of the edges of said second end section is about 4°.

12. The casing clamp of claim 9 wherein the distance between said throat and said upper edge is at least equal to one half the diameter of said remote speed control cable.

13. The casing clamp of claim 9 wherein the distance between opposite edges of said throat is less than the diameter of said casing and greater than the diameter of said control wire.

14. The casing clamp of claim 9 wherein the body of said clip member is U-shaped with each side of the U terminating in a bifurcated end.

15. The casing clamp of claim 9 wherein said mounting means includes first abutment means for preventing movement of said body axially with respect to said control cable axis.

16. The casing clamp of claim 15 wherein said mounting means further includes second abutment means for preventing movement of said body laterally with respect to said control cable axis.

17. In an internal combustion engine including a speed control lever on the engine and a remote speed control cable for moving said engine speed control lever to control the speed of the engine, said remote speed control cable defining a longitudinal axis and having a control wire connected at one end to a remote speed control lever and at its other end to said engine speed control lever and a casing surrounding said control wire slidable receiving said wire therein, the improvement comprising a casing clamp for fixedly mounting said casing on the engine to permit sliding movement of said control wire relative to said casing, said casing clamp comprising:

a clip member removable attachable to said casing including a flat body extending substantially perpendicular to the longitudinal axis of said cable, said body having a head end and bifurcated end defining a pair of legs having a cable-receiving opening therebetween dimensioned to tightly engage the casing of said cable, said cable-receiving opening includes a constricted middle section forming a throat, a first end section having opposite edges diverging from said throat to the bifurcated end of said clip member, and a second end section having opposite edges extending in a direction opposite to the edges of said first end section and diverging from said throat to an upper edge located between said throat and said head end, and the distance between said throat and said upper edge is at least equal to one half the diameter of said remote speed control cable to retain the cable in said cable-receiving opening and the distance between opposite edges of said throat is less than the diameter of said casing and greater than the diameter of said control wire to fixedly secure the casing in said cable-receiving opening; and mounting means on the engine for receiving and removably mounting said clip member thereon.

18. The casing clamp of claim 17 wherein the angle of divergence formed by the edges of said second end section is less than the angle of divergence formed by the edges of said first section.

19. The casing clamp of claim 18 wherein the angle of divergence of the edges of said second end section is about 4°.

20. The casing clamp of claim 17 wherein the body of said clip member is U-shaped with each side of the U terminating in a bifurcated end.

21. The casing clamp of claim 17 wherein said mounting means includes first abutment means for preventing movement of said body axially with respect to said control cable axis.

22. The casing clamp of claim 21 wherein said mounting means further includes second abutment means for preventing movement of said body laterally with respect to said control cable axis.

23. The casing clamp of claim 21 wherein the body of said clip member includes a tool-receiving opening therethrough disposed between the upper edge of said second end section and said head end.

* * * * *

UNITED STATES PATENT AND TRADEMARK OFFICE
CERTIFICATE OF CORRECTION

PATENT NO. : 4,889,006
DATED : December 26, 1989
INVENTOR(S) : Edmund C. Kolinske et al It is certified that error appears in the above-identified patent and that said Letters Patent is hereby corrected as shown below:

Claim 1, Col. 7, Line 5, after "wire", delete "slidable" and substitute therefore -- slidably --; Claim 1, Col. 7, Lines 17-18, after "and" delete "removable" and substitute therefore -- removably --; Claim 17, Col. 8, Line 61, after "wire", delete "slidable" and substitute therefore -- slidably --; Claim 17, Col. 8, Line 66, after "member", delete "removable" and substitute therefore -- removably --.

Signed and Sealed this

Second Day of April, 1991

Attest:

HARRY F. MANBECK, JR.

*Attesting Officer*  *Commissioner of Patents and Trademarks*